(12) United States Patent
Podbelski et al.

(10) Patent No.: US 9,250,494 B2
(45) Date of Patent: Feb. 2, 2016

(54) CONTROL SYSTEM FOR ELECTROCHROMIC DEVICE

(75) Inventors: Lou Podbelski, Eagan, MN (US); Bryan D. Greer, Northfield, MN (US); Mark O. Snyker, Apple Valley, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 140 days.

(21) Appl. No.: 13/354,863

(22) Filed: Jan. 20, 2012

(65) Prior Publication Data

US 2012/0194895 A1  Aug. 2, 2012

Related U.S. Application Data

(60) Provisional application No. 61/435,391, filed on Jan. 24, 2011.

(51) Int. Cl.
| | | |
|---|---|---|
| *G02F 1/153* | (2006.01) | |
| *G02F 1/157* | (2006.01) | |
| *G02F 1/163* | (2006.01) | |
| *G02F 1/133* | (2006.01) | |
| *E04B 2/88* | (2006.01) | |

(52) U.S. Cl.
CPC . *G02F 1/157* (2013.01); *E04B 2/88* (2013.01); *G02F 1/163* (2013.01); *G02F 2001/13324* (2013.01)

(58) Field of Classification Search
CPC ........................................................ G02F 1/15
USPC ................................ 359/265, 275; 250/517.1
See application file for complete search history.

(56) References Cited

U.S. PATENT DOCUMENTS

| | | | |
|---|---|---|---|
| 5,822,107 A | | 10/1998 | Lefrou et al. |
| 6,055,089 A | * | 4/2000 | Schulz et al. ................ 359/270 |
| 6,130,772 A | | 10/2000 | Cava |
| 6,594,067 B2 | | 7/2003 | Poll et al. |
| 7,525,714 B2 | | 4/2009 | Poll et al. |
| 2006/0077511 A1 | * | 4/2006 | Poll et al. .................. 359/265 |
| 2008/0234893 A1 | | 9/2008 | Mitchell et al. |
| 2010/0188057 A1 | * | 7/2010 | Tarng .......................... 323/225 |
| 2013/0278989 A1 | * | 10/2013 | Lam .......................... B60J 3/04 359/275 |

FOREIGN PATENT DOCUMENTS

| | | |
|---|---|---|
| IT | MI910453 | 8/1992 |
| JP | S58131021 U | 9/1983 |
| JP | S60253688 A | 12/1985 |
| JP | 5147983 A | 6/1993 |
| JP | 2004505298 A | 2/2004 |

(Continued)

OTHER PUBLICATIONS

International Search Report and Written Opinion for PCT/US2012/022033 dated May 2, 2012.

(Continued)

*Primary Examiner* — Joseph P Martinez
(74) *Attorney, Agent, or Firm* — Abel Law Group, LLP; Robert N Young

(57) ABSTRACT

The present invention is directed to electrochromic systems comprising an electrochromic glazing or insulated glazing unit, a photovoltaic module for supplying power to the electrochromic glazing or IGU, and an electronics module in communication either the electrochromic glazing and/or photovoltaic module.

23 Claims, 22 Drawing Sheets

(56) References Cited

FOREIGN PATENT DOCUMENTS

| | | | |
|---|---|---|---|
| JP | 2005282106 A | 10/2005 | |
| JP | 2008059859 A | 3/2008 | |
| JP | 2011002733 A | 1/2011 | |

OTHER PUBLICATIONS

European Communication for Application No. 12704168.9 dated Sep. 3, 2013.

* cited by examiner

CONTROL SYSTEM FOR ELECTROCHROMIC DEVICE

CROSS-REFERENCE TO RELATED APPLICATIONS

This application claims the benefit of the filing date of U.S. Provisional Patent Application No. 61/435,391 filed Jan. 24, 2011, the disclosure of which is hereby incorporated herein by reference.

BACKGROUND OF THE INVENTION

Electrochromic glazings include electrochromic materials that are known to change their optical properties, such as coloration, in response to the application of an electrical potential, thereby making the device more or less transparent or more or less reflective. Typical prior art electrochromic devices include a counter electrode layer, an electrochromic material layer which is deposited substantially parallel to the counter electrode layer, and an ionically conductive layer separating the counter electrode layer from the electrochromic layer respectively. In addition, two transparent conductive layers are substantially parallel to and in contact with the counter electrode layer and the electrochromic layer. Materials for making the counter electrode layer, the electrochromic material layer, the ionically conductive layer and the conductive layers are known and described, for example, in United States Patent Publication No. 2008/0169185, incorporated by reference herein, and desirably are substantially transparent oxides or nitrides. When an electrical potential is applied across the layered structure of the electrochromic device, such as by connecting the respective conductive layers to a low voltage electrical source, ions, such as Li+ ions stored in the counter electrode layer, flow from the counter electrode layer, through the ion conductor layer and to the electrochromic layer. In addition, electrons flow from the counter electrode layer, around an external circuit including a low voltage electrical source, to the electrochromic layer so as to maintain charge neutrality in the counter electrode layer and the electrochromic layer. The transfer of ions and electrons to the electrochromic layer causes the optical characteristics of the electrochromic layer, and optionally the counter electrode layer in a complementary EC device, to change, thereby changing the coloration and, thus, the transparency of the electrochromic device.

When installing electrochromic glazings, installing wires for power and control through the building's window framing system and the building's structural systems/supports can be difficult and costly. A well-designed wireless controller coupled with photovoltaic cells can dramatically reduce the cost and complexity of installation, especially for architectural retrofit applications. The combination of photovoltaics and electrochromics provides excellent synergies, with tinting generally required only in daylight, and greater tinting with greater solar energy. Designing such a product for ease of manufacture and installation presents many challenges, given the diversity of framing systems and stringent aesthetic requirements of architects. To complicate matters, electronics should be replaceable without replacing or deglazing the unit and, if a battery is used, it also needs to be user replaceable.

BRIEF SUMMARY OF THE INVENTION

In one aspect of the invention is a device for modulating the transmission of light from a light source, comprising an electrochromic glazing ("EC glazing") having light transmissivity that is variable in response to an electrical current; at least one photovoltaic module for providing the electrical current in response to light from the light source incident on the photovoltaic module; and an electronics module in communication with the photovoltaic module and the electrochromic glazing. In some embodiments, the electronics module in wireless communication with a building automation system. In other embodiments, the photovoltaic module is mounted adjacent to the electrochromic glazing on an exterior building frame-work. In yet other embodiments, the photovoltaic module and/or the electronics module are integrated into the electrochromic glazing assembly. In yet other embodiments, the photovoltaic module ("PV module") is combined with the electronics module. In yet other embodiments, the system further comprises a battery.

In another aspect of the invention is a device for modulating the transmission of light from a light source, comprising an electrochromic glazing having light transmissivity that is variable in response to an electrical current; at least one photovoltaic module electrically connected to the electrochromic glazing for providing the electrical current to the electrochromic glazing in response to light from the light source incident on the photovoltaic module; and an electronics module in communication with either of the photovoltaic module or the electrochromic glazing. In another embodiment, the electronics module is in wireless communication with a building automation system. In another embodiment, photovoltaic module is mounted adjacent to the electrochromic glazing on an interior or exterior building frame-work. In another embodiment, photovoltaic module is mounted to an interior or exterior surface of the electrochromic glazing or within an insulated glazing unit. In some embodiments, the photovoltaic module comprises a photovoltaic material which may be an interior or exterior layer in a glass laminate. In another embodiment, electrochromic glazing is a laminate of at least two glass panes and wherein the photovoltaic module is mounted between the laminate glass panes. In another embodiment, electronics module is mounted to an interior or exterior surface of the electrochromic glazing or within an insulated glazing unit. In another embodiment, electronics module is mounted adjacent to the electrochromic glazing on an interior or exterior building frame-work.

In another embodiment, photovoltaic module and the electronics module are mounted at different locations. In another embodiment, photovoltaic module is located on an exterior surface, and the electronics module is located inside or protruding into a framing system, and wherein the electronics module is in wireless communication with a building automation system. In another embodiment, photovoltaic module is located on an exterior surface, and the electronics module is located in an interior frame-work, and wherein the electronics module is in wireless communication with a building automation system. In another embodiment, electronics module further comprises a battery. In another embodiment, photovoltaic module is located on an interior insulated glazing surface, and the electronics module is located in an interior frame-work, wherein the electronics module is in wireless communication with a building automation system, and wherein the electronics module further comprises a battery. In another embodiment, photovoltaic module is located within an electrochromic glass laminate.

In another embodiment, photovoltaic module and the electronics module are combined into a single unit. In another embodiment, combined photovoltaic and electronics module have a thickness less than about 10 mm.

In another embodiment, electronics module responds to solar intensity such that the electrochromic glazing tints or colors proportionally to available sunlight. In another embodiment, electronics modules comprises control logic means. In another embodiment, control logic means monitors available energy from the photovoltaic module.

In another embodiment, the device further comprises a battery. In another embodiment, the electrochromic glazing or IGU contains a privacy or anti-glare coating. In some embodiments, the IGU comprises two EC glazings.

In another embodiment, photovoltaic module and the electronics module are combined and mounted adjacent to the electrochromic glazing on a building frame-work. In another embodiment, electronics module is in wireless communication with a building automation system.

In another embodiment, electronics module comprises a photovoltaic module and a resistor wired in parallel with an electrochromic glazing wiring.

In another embodiment, photovoltaic module is connected to the electronics module through an electrical feed-through. In another embodiment, photovoltaic module is coupled to the electronics module via a wireless energy transfer means.

In another aspect of the present invention is a device for modulating the transmission of light from a light source, comprising an electrochromic glazing having light transmissivity that is variable in response to an electrical current; at least one photovoltaic module electrically connected to the electrochromic glazing for providing the electrical current to the electrochromic glazing in response to light from the light source incident on the photovoltaic module; and an electronics module in communication with either of the photovoltaic module or the electrochromic glazing, wherein the electronics module is in wireless communication with a building automation system or other interface/control system.

In another embodiment, photovoltaic module is mounted adjacent to the electrochromic glazing on an interior or exterior building frame-work. In another embodiment, photovoltaic module is mounted to an interior or exterior surface of the electrochromic glazing or within an insulated glazing unit. In another embodiment, electrochromic glazing is a laminate of at least two glass panes and wherein the photovoltaic module is mounted between the laminate glass panes. In another embodiment, electronics module is mounted to an interior or exterior surface of the electrochromic glazing or within an insulated glazing unit. In another embodiment, electronics module is mounted adjacent to the electrochromic glazing on an interior or exterior building frame-work.

In another embodiment, photovoltaic module and the electronics module are mounted at different locations. In another embodiment, photovoltaic module is located on an exterior surface, and the electronics module is located inside or protruding into a framing system, and wherein the electronics module is in wireless communication with a building automation system. In another embodiment, photovoltaic module is located on an exterior surface, and the electronics module is located in an interior frame-work, and wherein the electronics module is in wireless communication with a building automation system. In another embodiment, electronics module further comprises a battery. In another embodiment, photovoltaic module is located on an interior insulated glazing surface, and the electronics module is located in an interior frame-work, wherein the electronics module is in wireless communication with a building automation system, and wherein the electronics module further comprises a battery. In another embodiment, photovoltaic module is located within an electrochromic glass laminate.

In another embodiment, photovoltaic module and the electronics module are combined into a single unit. In another embodiment, combined photovoltaic and electronics module have a thickness less than about 10 mm.

In another embodiment, electronics module responds to solar intensity such that the electrochromic glazing tints or colors proportionally to available sunlight. In another embodiment, electronics modules comprises control logic means. In another embodiment, control logic means monitors available energy from the photovoltaic module.

In another embodiment, the device further comprises a battery.

In another embodiment, photovoltaic module and the electronics module are combined and mounted adjacent to the electrochromic glazing on a building frame-work. In another embodiment, electronics module is in wireless communication with a building automation system.

In another embodiment, electronics module comprises a photovoltaic module and a resistor wired in parallel with an electrochromic glazing wiring.

In another embodiment, photovoltaic module is connected to the electronics module through an electrical feed-through. In another embodiment, photovoltaic module is coupled to the electronics module via a wireless energy transfer means.

In another aspect of the present invention, is a method of constructing a device for modulating the transmission of light from a light source, comprising an electrochromic glazing having light transmissivity that is variable in response to an electrical current; at least one photovoltaic module electrically connected to the electrochromic glazing for providing the electrical current to the electrochromic glazing in response to light from the light source incident on the photovoltaic module; and an electronics module in communication with either of the photovoltaic module or the electrochromic glazing, wherein the electronics module is in optional wireless communication with a building automation system.

DETAILED DESCRIPTION

Figure 1:
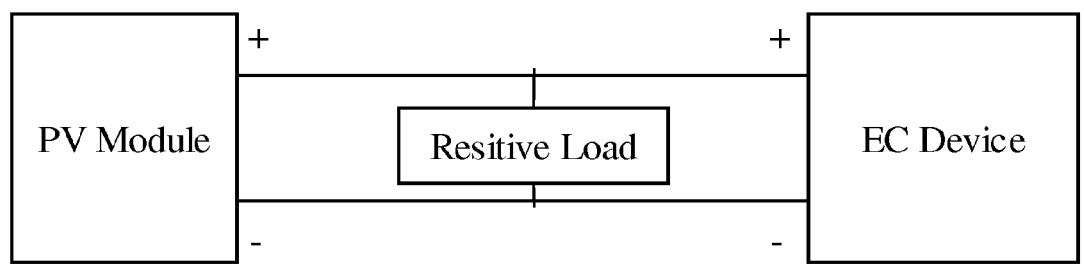
FIG. 1 shows an electronics module, comprising a photovoltaic module and a resistor, wired in parallel with an electrochromic glazing.

The present invention is directed to electrochromic systems comprising an electrochromic glazing or insulated glazing unit (hereinafter "IGU"), a photovoltaic (hereinafter "PV") module for supplying power to the electrochromic glazing or IGU, and an electronics module in communication with either the electrochromic glazing unit and/or photovoltaic module.

Insulated glazing units, as that term is used herein, means two or more layers of glass separated by a spacer along the edge and sealed to create a dead air (or other gas, e.g., argon, nitrogen, krypton) space between the layers. The terms "electrochromic glazing" or "IGU" are used interchangeably herein. The electrochromic glazing may have a laminate structure (see copending U.S. application Ser. Nos. 13/040,787 and 13/178,065, the disclosures of which are hereby incorporated by reference herein in their entirety).

The electrochromic glazing and/or IGU are typically used for architectural purposes, e.g. architectural windows in buildings. As such, the electrochromic glazings or IGUs are installed within a window pane or other type of building frame-work (collectively referred to herein as "frame-work" or "building frame-work"). As those skilled in the art will recognize, the building frame-work often includes a frame cap on the exterior of the frame. A frame cap is, generally, an aesthetic extrusion which is mounted onto the frame near the end of the assembly process, and which can be removed later. This technology could be adapted for use in other applications, such as in the transportation industry, e.g., for use in vehicles.

The photovoltaic module(s) could be located in any place deemed appropriate by those skilled in the art. In some embodiments, the photovoltaic modules are located externally on or around building frame-work. In other embodiments, the photovoltaic modules are located directly on the electrochromic glazing or IGU surface, typically at the bottom, if the glass is vertical in order to minimize shading. If the electrochromic glazing is a laminate structure, the photovoltaic module(s) may be laminated between the glass panes, which is a common construction method for photovoltaic panels. Those skilled in the art will be able to include as many photovoltaic cells within the photovoltaic module as necessary to appropriately power the electrochromic glazing and/or the electronics module. Typically, these will comprise between about 2% and about 8% of glass area, assuming cell efficiencies of about 15% to about 20%. The most common construction for these photovoltaic modules is a glass laminate. Alternative modules, such as those made by SunWize of San Jose, Calif., are constructed by mounting solar cells on a fiberglass substrate and encapsulating in polyurethane, resulting in a thin, light, but rugged module.

The photovoltaic module and optional battery will be sized according to application and environment details. For example, a south-facing 15 ft^2 IGU in Golden, Colo., expected to only respond automatically to daylight might only require a 3 W (peak) solar panel and 8 Wh lithium-ion battery, whereas an east-facing 15 ft^2 IGU in Bosie, Id. expected to be manually tinted for glare 10% of the day might need a 4.5 W solar panel and 12 Wh battery.

Additional features of photovoltaic modules, their use in combination with electrochromic glazings or IGUs, and options for their positioning in relation to an electrochromic glazing or IGU are described in U.S. Pat. No. 6,055,089, the disclosure of which is hereby incorporated by reference herein in its entirety.

In some embodiments, the photovoltaic module and electronics modules are combined, in whole or in part, into a single package or module. For example, the electronics module can be incorporated behind the cells in a PV module. This combined module could be located on the building frame-work, the interior or exterior surfaces of the glazing, or even within an electrochromic IGU.

The electronics module, when separate from the photovoltaic module, can be located in the inner or outer portions of any building frame-work as described further herein. In other embodiments, the electronics module could be located on the backside of the IGU itself.

Those skilled in the art will be able to design an appropriate electronics module combining those features typically associated with solar-powered electronics and electrochromic devices. Typical components known to those of skill in the art include (i) microprocessor control, typically using an embedded 8- or 16-bit microcontroller such as those made by Micro-Chip or Cypress Semiconductor; (ii) linear or switching voltage regulators to provide variable voltage to the electrochromic glazing; (iii) wireless communication modules; (iv) linear or switching voltage regulators to convert photovoltaic voltage to circuit requirements; (v) battery charge/discharge control components; and (vi) batteries or super-capacitors to permit faster switching in low light. Any of these features may be used alone or in combination to produce an appropriate electronics module. In some embodiments, the microprocessor manages all functions of voltage conversion, battery control, and communications (wires or wireless). In some embodiments, the wireless module includes a transceiver circuit and an antenna (for RF communications). In other embodiments, the electronics module could be combined with other optional components, such as a battery.

In some embodiments, the electronics module responds to solar intensity, causing the electrochromic glazing or IGU to tint or color proportionally to available sunlight. In some embodiments, the electronics module comprises a photovoltaic module and a resistor wired in parallel with the electrochromic glazing wiring, as depicted in FIG. 1.

By way of example, Table 1 illustrates a sample performance calculation using two crystalline photovoltaic cells to provide for a maximum of about 1.1V, a peak current of about 1 A, and about a 2-ohm resistive load. The resistor would need to be rated for at least 1 W and could be of any suitable type, such as wirewound or carbon composition. In Table 1, the PV+resistor voltage is derived from typical response curves of crystalline PV cells. The EC tint level is derived from the PV+resistor voltage, using measurements of tint level as a function of voltage at equilibrium. The solar output is simply the product of available sunlight and EC tint level, and the inside light is simply the product of the solar output and a typical full-sun illuminance value of 100 klux. The table shows how the resistor can function to maintain a consistent interior illuminance. This passive system results in, it is believed, a very low total cost with simple installation.

TABLE 1

| Available sunlight (percent of full solar energy incident on IGU) | PV + resistor output (V) | EC tint level (%) | Solar out (percent of full solar energy passing through EC) | Inside light (klux) (illuminance passing through EC) |
| --- | --- | --- | --- | --- |
| 100% | 1.1 | 10% | 10.00% | 10 |
| 80% | 1.08 | 11% | 8.80% | 8.8 |
| 60% | 1.05 | 12% | 7.20% | 7.2 |
| 40% | 0.8 | 25% | 10.00% | 10 |
| 20% | 0.4 | 50% | 10.00% | 10 |
| 0% | 0 | 60% | 0.00% | 0 |

Figure 2:
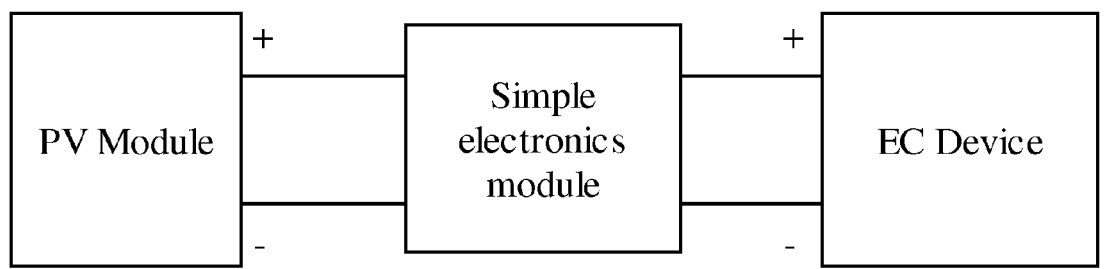
FIG. 2 illustrates the communication between a photovoltaic module, an electronics module, and an electrochromic glazing.

In other embodiments, the electronics module includes control logic to apply a reverse polarity at low light levels to ensure a fully clear state, and an optimized response to daylight. The communication between a photovoltaic module, an electronics module, and an electrochromic glazing is depicted in FIG. 2.

Figure 3:
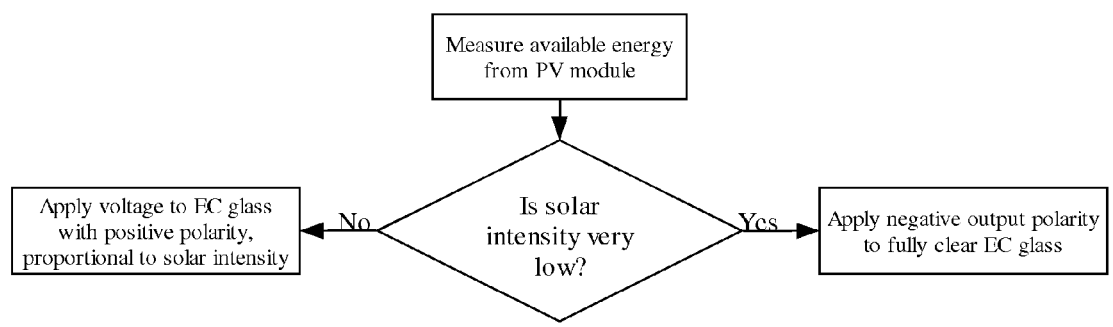
FIG. 3 provides a flowchart showing the operational control or logic of an embodiment of an electronics module.

A flow chart showing the operational control or logic of an embodiment of an electronics module is depicted in FIG. 3.

In some embodiments, the electronics module, alone or combined with the photovoltaic module, is capable of wireless communication with a central control system, building management system (BMS), or other user interface (collectively referred to herein as "control system"). For example, the BMS interface could be BACnet, LonWorks, KNX, or any other such interface. In these embodiments, the wireless communication can be used, for example, for manual over-ride selection of a specific state, synchronization between multiple panes, or integration with a building automation system, and optionally, energy storage (battery or super-capacitor) to permit rapid switching in low light, or switching in anticipation of an event (such as sunrise or sunset).

The control system could link to the electrochromic systems described above via infrared pulses, radio waves, ultrasonic waves, or another wireless communication medium as described in U.S. Pat. Nos. 7,277,215, 7,133,181, and 6,055,089, the disclosures of which are hereby incorporated by reference herein in their entirety. Other features of the control system capable of integration into the present invention are also described in these very same patents. In some embodiments, wireless communications are through a standard protocol, for example a Zigbee mesh network, 802.11 WiFi, or Bluetooth. Proprietary solutions could also be used. Wireless communication protocols will typically be accomplished using integrated circuits or modules specifically designed for the purpose. Modules appropriate for the purpose include those manufactured by, for example, Digi International, Synapse Wireless, Motorola, or Panasonic.

In some embodiments, if electronics are on the inside of the building, there will be an available surface for antenna mounting, and the antenna could be a separately mounted module, a component in the electronics module, or designed into the printed wiring board (PWB) itself. In other embodiments, the antenna could be formed on the glass itself from transparent conductors or bus bar material. In yet other embodiments, the photovoltaic module could have space to mount a flat antenna structure, such as where there are no photovoltaic cells.

Figure 4:
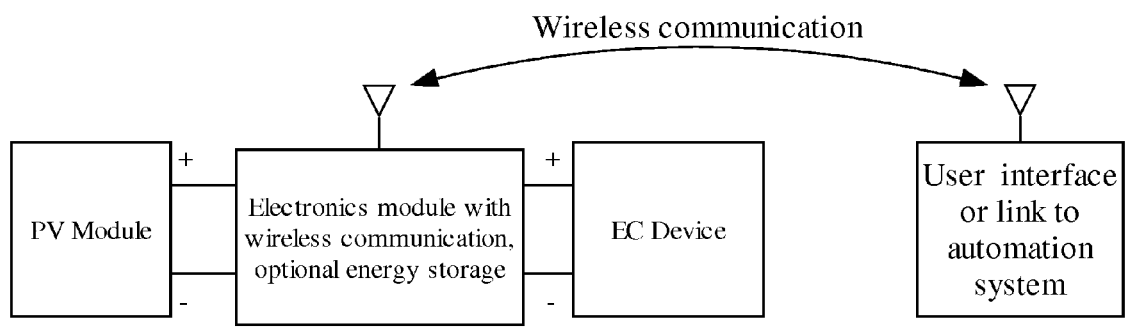
FIG. 4 illustrates the integration between a photovoltaic module, an electronics module, and an electrochromic device.
Figure 5A:
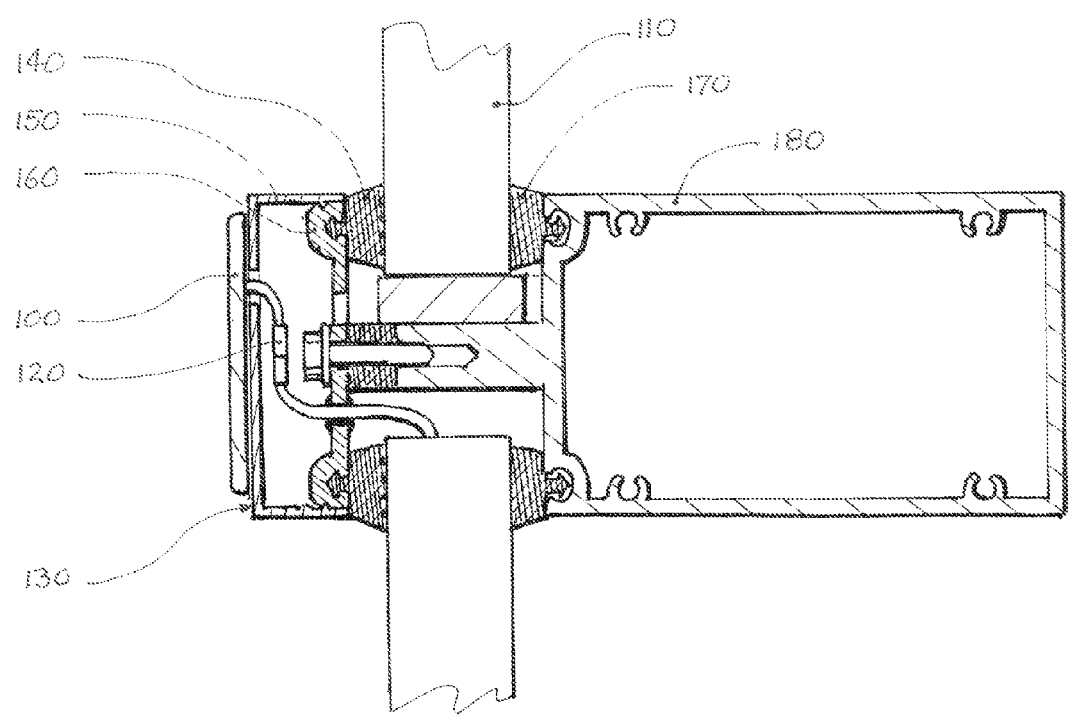
FIGS. 5a-5d provide configurations of a control system having a photovoltaic module, and electronics module, and an electrochromic glazing.
Figure 5B:
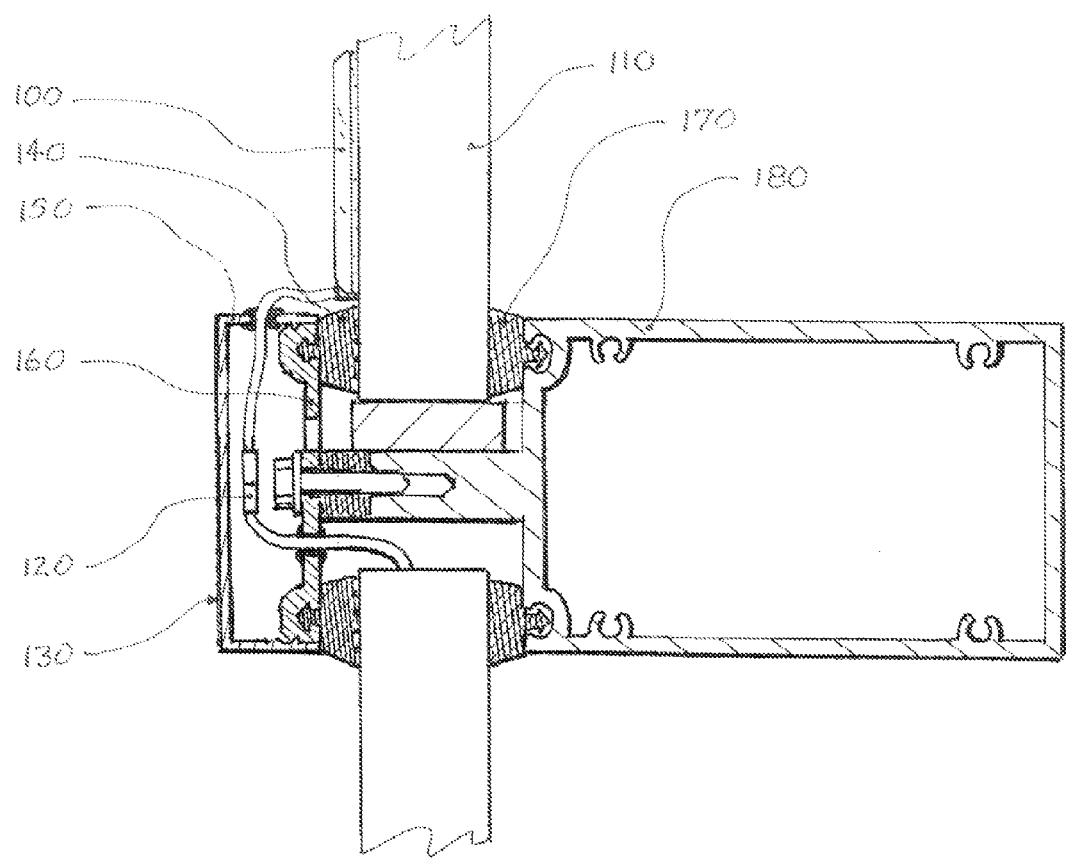
Figure 5C:
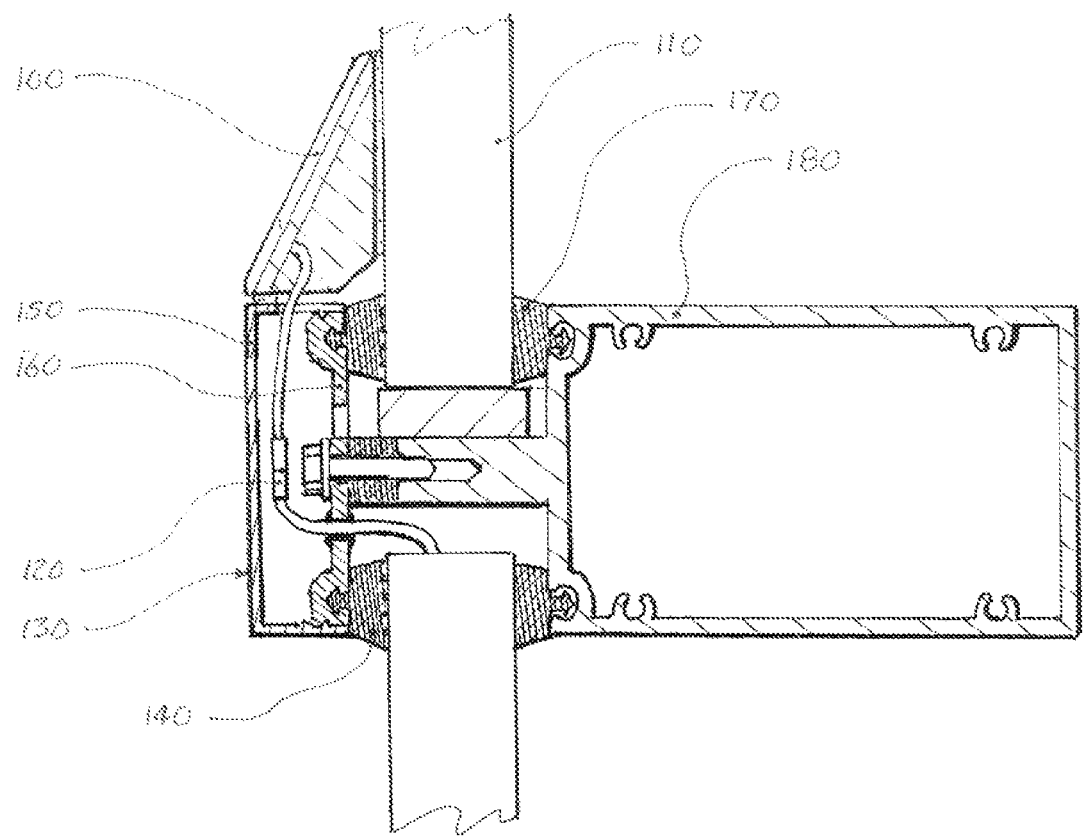
Figure 5D:
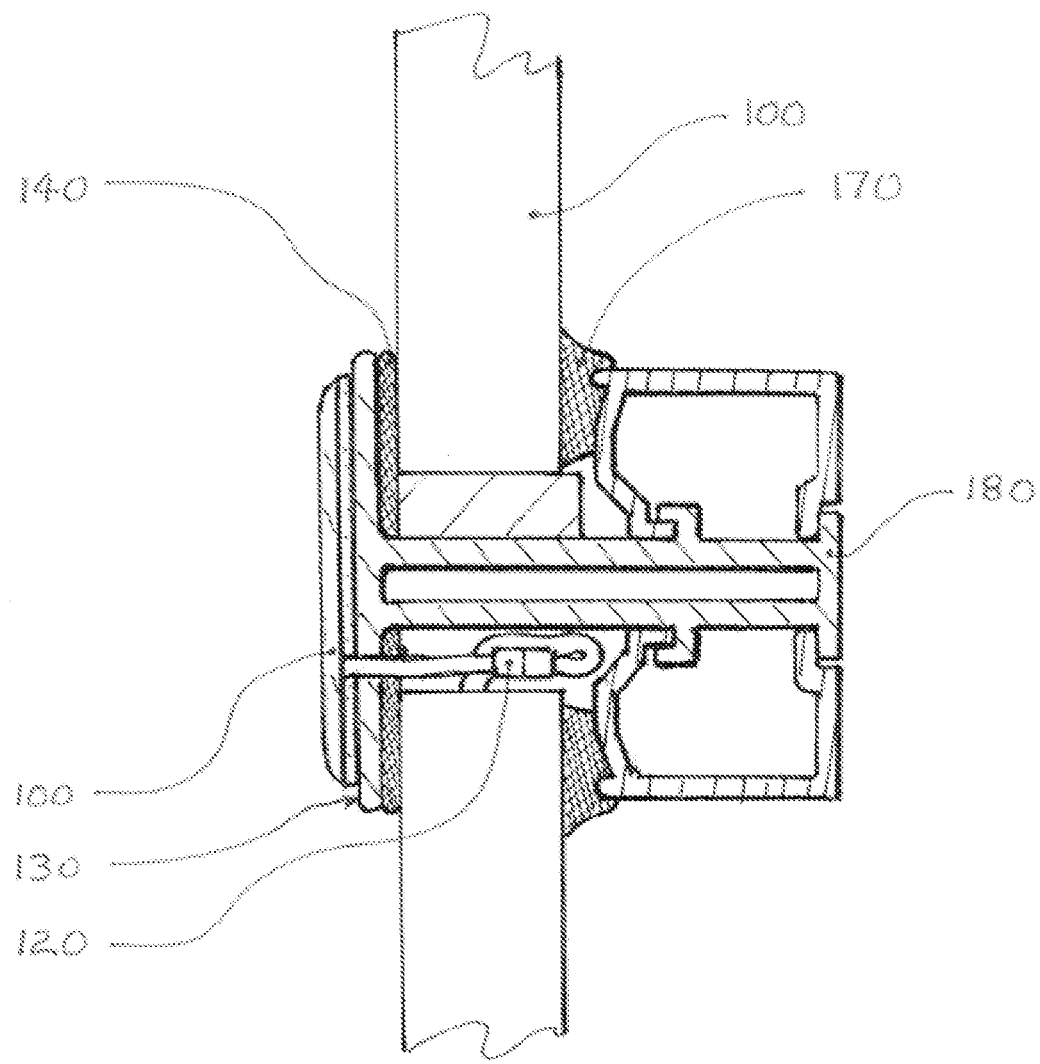

The communication and/or integration between a photovoltaic module, an electronics module, and an electrochromic device, all in wireless communication with a user interface or link to an automation system, is depicted in FIG. 4.

The electronics module, in some embodiments, is also capable of communicating directly with other electronics modules in other electrochromic systems or other building systems (via wired or wireless communication). For example, if a Zigbee mesh is used, all units can talk directly to each other, permitting them to coordinate tint level for a uniform appearance. A module with a Bluetooth interface could directly communicate with wireless telephones. A module with a WiFi (802.11) interface could communicate directly with desktop or portable PCs or routers.

In some embodiments, the electrochromic systems further comprise a battery separate from the electronics module. In other embodiments, the battery is rechargeable or user-replaceable, i.e., in routine maintenance, the battery (or batteries) may be replaced if their performance drops. Suitable batteries include those based on various lithium technologies, nickel-cadmium or nickel-metal-hydride. Lithium-ion cells with iron-phosphate cathodes (LiFePO4 cells) offer long life, good performance over temperature, and safety appropriate to this application. As alternative storage technologies evolve, they could become suitable for use with the present invention, including technologies such as supercapacitors/ultracapacitors or thin-film batteries.

The photovoltaic module or electronics module could optionally comprise additional interfaces or modules for future expansion purposes. Any control system could likewise be used to control these additional interfaces or modules. For example, it is entirely possible to incorporate interfaces or modules for the future addition of lighting systems, e.g. LED lights, into each electrochromic system, or information displays to show status of the glazings or other information. Specific examples of different methods of incorporating an electrochromic glazing/IGU, a photovoltaic module, and an electronics module into an electrochromic system are described further in the following examples.

In a first aspect of the present invention (see FIG. 5), a combined photovoltaic/electronics module 100 (with or without wireless communication) for an electrochromic glazing 110 is mounted to the exterior of the building or window framing system 130. In some embodiments, the photovoltaic/electronics module (with wireless communication) is mounted on a portion of the frame which has available space within the frame for an electrical connection 120 and exterior access to the glazing pocket, as depicted in FIG. 5. A glazing pocket, as that term is understood in the art, is the unfilled space immediately surrounding the IGU to allow for installation and IGU size tolerance. A pressure-plate system is an example of such a system. In some embodiments, the electrical connection 120 between IGU and control systems is made with a water-resistant electrical connector capable of supplying the voltage and current requirements of the IGU. Other elements shown in FIG. 5 include an exterior seal 140, clamp plate cover 150, frame clamp plate 160, interior seal 170, and interior frame 180.

The combined photovoltaic/electronics module (with wireless communication) can have any thickness. In some embodiments, the combined PV/wireless control module is preferably less than about 10 mm thick, more preferably less than about 6 mm thick, so as to minimize its visual impact. In some embodiments, the visible surface will be almost entirely comprised of a photovoltaic surface (cells). Having the PV and/or electronic modules attached to the pressure plate permits installation after the glass is installed, and easy replacement in case of failure or damage thereafter. Having the PV module on the pressure plate permits adequate area for solar energy capture without impinging on the vision area of the glazing, maximizing the opportunity for daylight.

Figure 6:
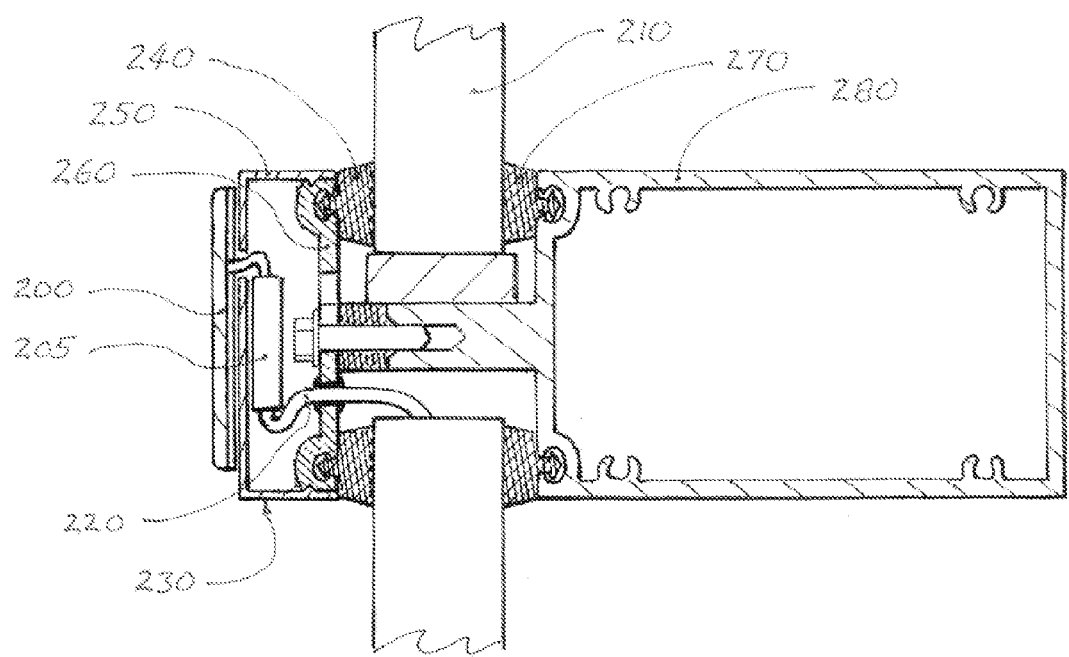
FIG. 6 provides a configuration of a control system having a photovoltaic module, and electronics module, and an electrochromic glazing.
Figure 7A:
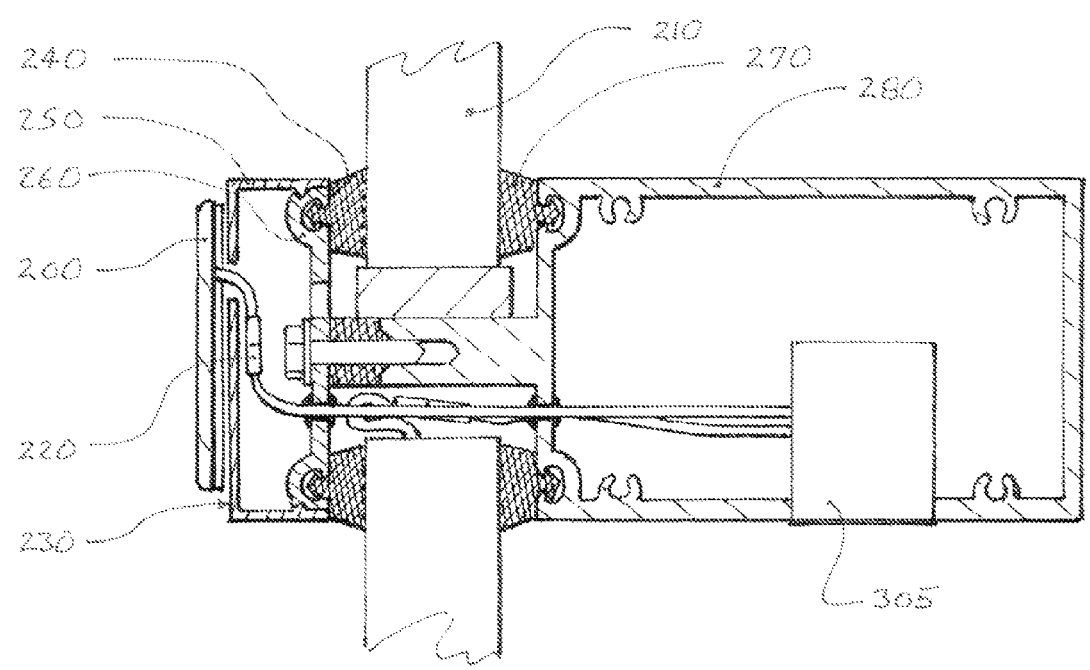
FIGS. 7a-7e provide configurations of a control system having a photovoltaic module, and electronics module, and an electrochromic glazing.
Figure 7B:
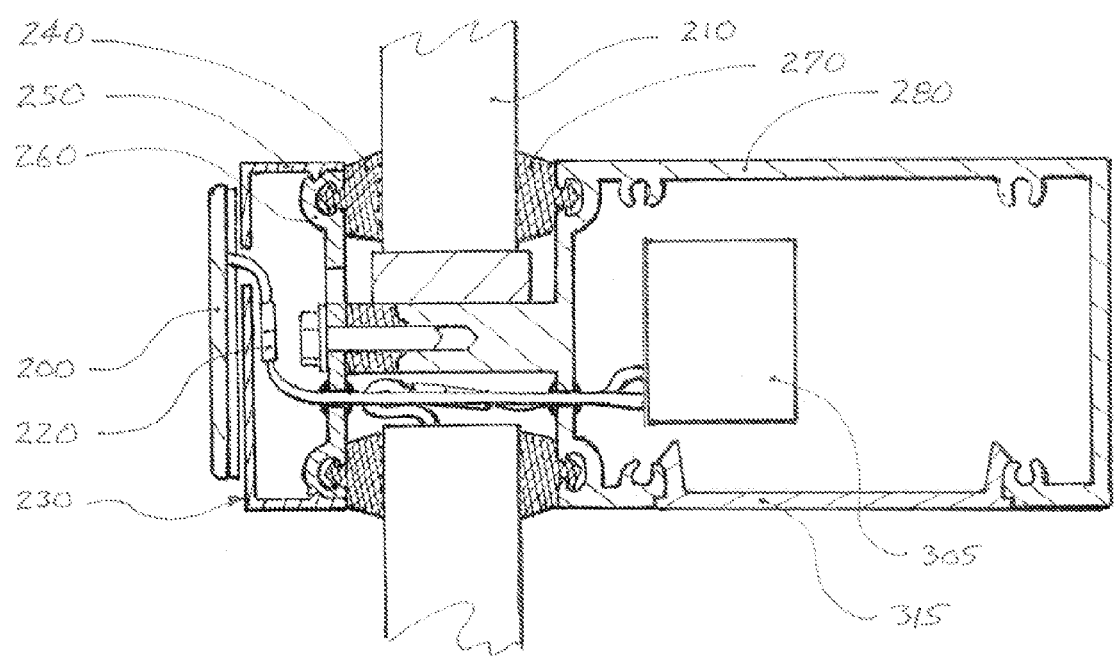
Figure 7C:
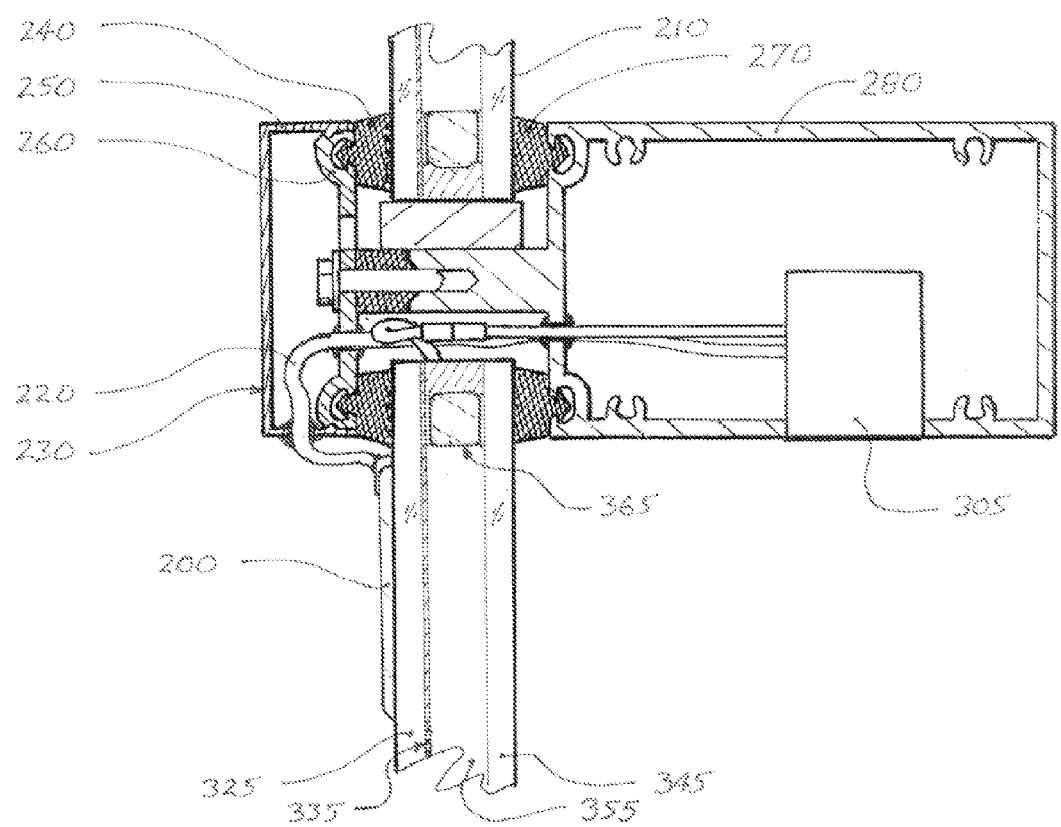
Figure 7D:
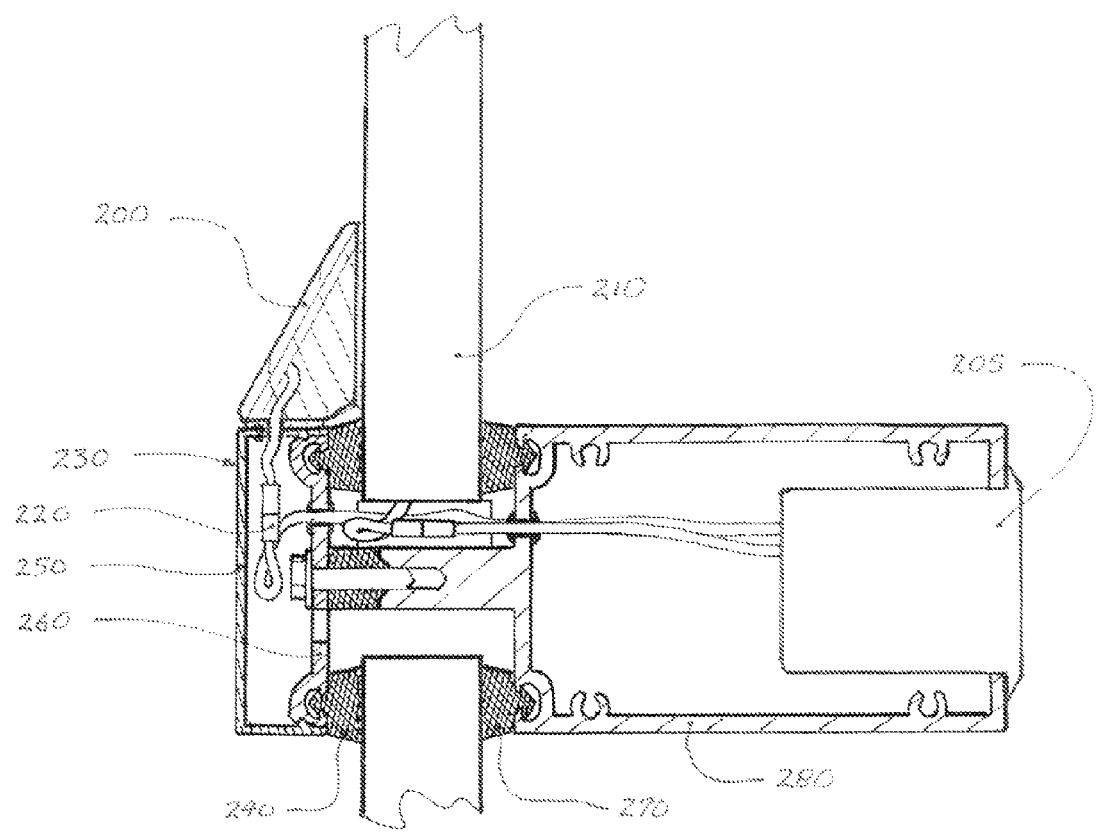
Figure 7E:
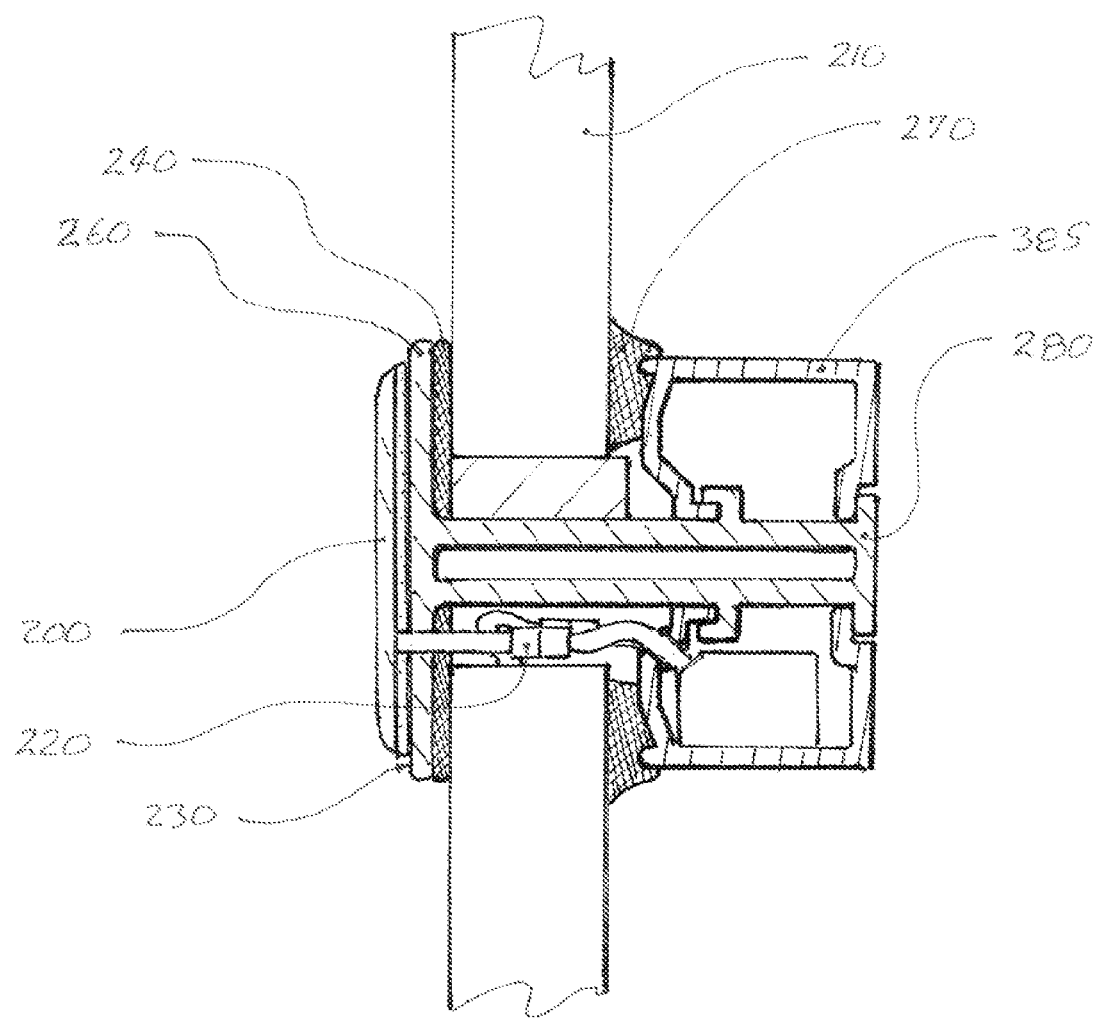

In a second aspect of the present invention (see FIG. 6), a photovoltaic module 200 is mounted on the exterior surface 230, with the electronics module 205 inside or protruding into the building or window framing system. It is believed that this would further minimize the profile of the resulting system. In some embodiments, the electronics could hang freely. In other embodiments, the electronics could be mounted to the frame cover. In yet other embodiments, the electronics could be mounted to the pressure plate, as depicted in FIG. 6. Other features include an exterior seal 240, clamp plate cover 250, frame clamp plate 260, exterior surface 230, electrochromic device or IGU 210, interior seal 270, and interior frame 280.

In a third aspect of the present invention (see FIG. 7), the electronics module 305 is moved to the interior frame, as compared to the placement depicted in FIG. 6. It is believed that this has the benefit of allowing replacement of either the electronics module or the replacement of an optional rechargeable battery, from the inside of the space. In this depicted embodiment (and others which follow), the electronics module and battery may be combined into a single unit or may be kept separate.

In a fourth aspect of the present invention, the photovoltaic module 405 is located within the IGU 475 as depicted in FIG. 8. The electronics module 465, in some embodiments, is located in the interior building frame. While it is believed that this may result in a partial loss of vision area, this design, it is believed, simplifies installation by eliminating a wiring connection. It is also believed that this particular embodiment may reduce costs and improve reliability by eliminating the need to environmentally seal the photovoltaic unit. Based on about 15%-20% efficient crystalline cells comprising the photovoltaic module, it is estimated that about 2% to about 3% of glass area is required in systems with a battery, or up to 8% for systems without a battery, because of demands for high current when switching rapidly in moderate light levels. Other components shown include an IGU glazing lite 415, electrochromic layers 425, an IGU internal cavity 435, and an IGU spacer and seals 455.

In some embodiments, if the photovoltaic module is behind the electrochromic surface (see, e.g. FIG. 8b), switching films would need to be removed or at least deactivated to ensure maximum energy availability. In some embodiments, the photovoltaic module is mounted inside the IGU, and either (1) on top of non-switching electrochromic layer areas; or (2) laminated within EC film layers.

In this configuration, it is possible to use the same bus bar system used by the electrochromic glass to bring out power to the external circuit. In addition, the photovoltaic module may, in some embodiments, share a common connection with the electrochromic glass. For example, a 2-busbar electrochromic IGU with photovoltaic might only require three electrical penetrations. Further information on related positioning is described in U.S. Pat. No. 6,055,089, incorporated by reference herein in its entirety.

In another embodiment, where the electrochromic glass is laminated to another piece of glass such that the electrochromic films are facing away from the lamination surface, the photovoltaic cells could be laminated between the panes. In other embodiments, the photovoltaic module may comprise photovoltaic film layers which are laminated between two glazing or glass lites, preferably on the exterior side of the electrochromic film layers (see, e.g. FIG. 8d). This utilizes standard PV-laminate manufacturing technology and, in some embodiments, would have a separate set of wiring feed-throughs from the electrochromic glass. In this configuration, it is believed that more energy would be available because sunlight would only be passing through a single pane of glass to arrive at the photovoltaic module. In some embodiments, the laminate may be part of a triple pane IGU. For example, FIG. 8F illustrates photovoltaic film layers laminated in a triple pane IGU, where the triple pane IGU comprises an exterior glazing lite pane 416, an internal glazing lite pane 417, and an interior glazing lite pane 418. The configuration of FIG. 8F may also optionally comprise one or both of a privacy technology film layer 495 (which could, e.g., be laminated on an innermost face of an IGU's internal glazing lite or laminated on an inner most glazing lite) and/or a second electrochromic film layer 490 (which may be laminated, e.g., on an interior most face of an IGU's internal glazing lite or an inner most glazing lite).

Figure 8A:
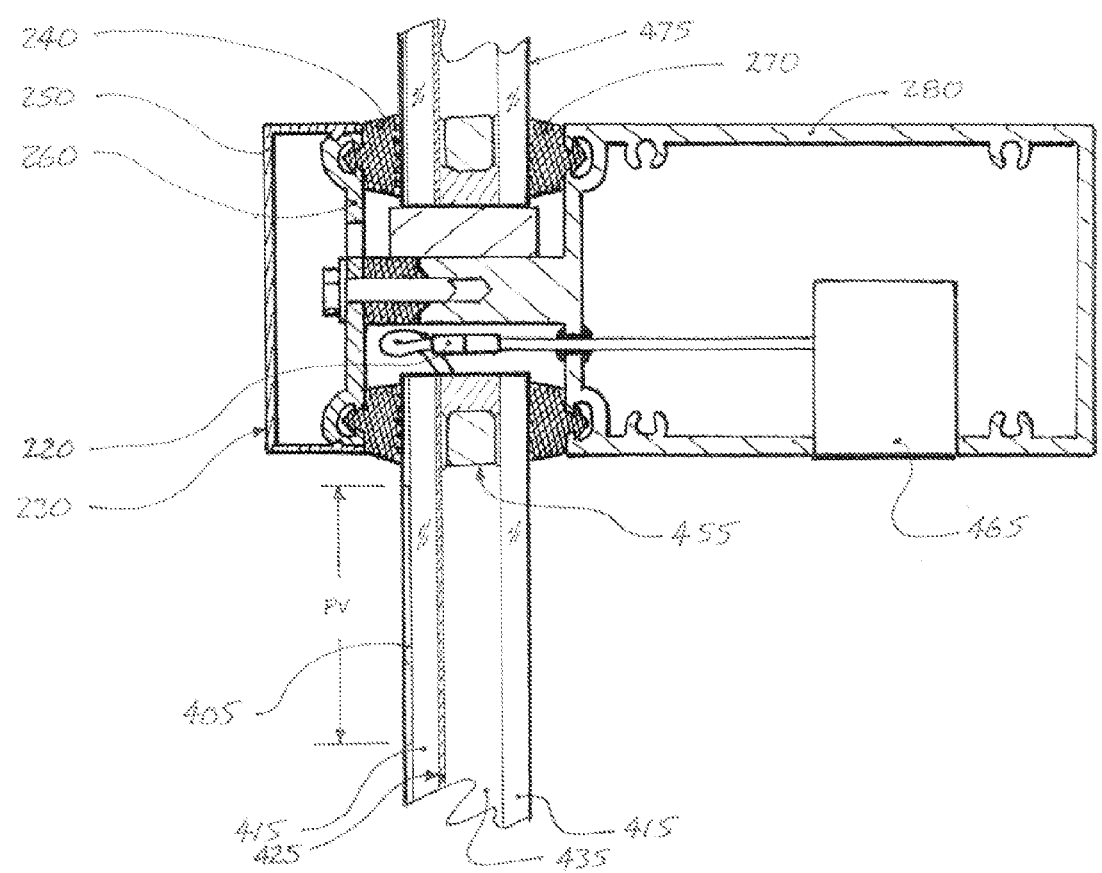
FIGS. 8a-8f provide configurations of a control system having a photovoltaic module, and electronics module, and an electrochromic glazing.
Figure 8B:
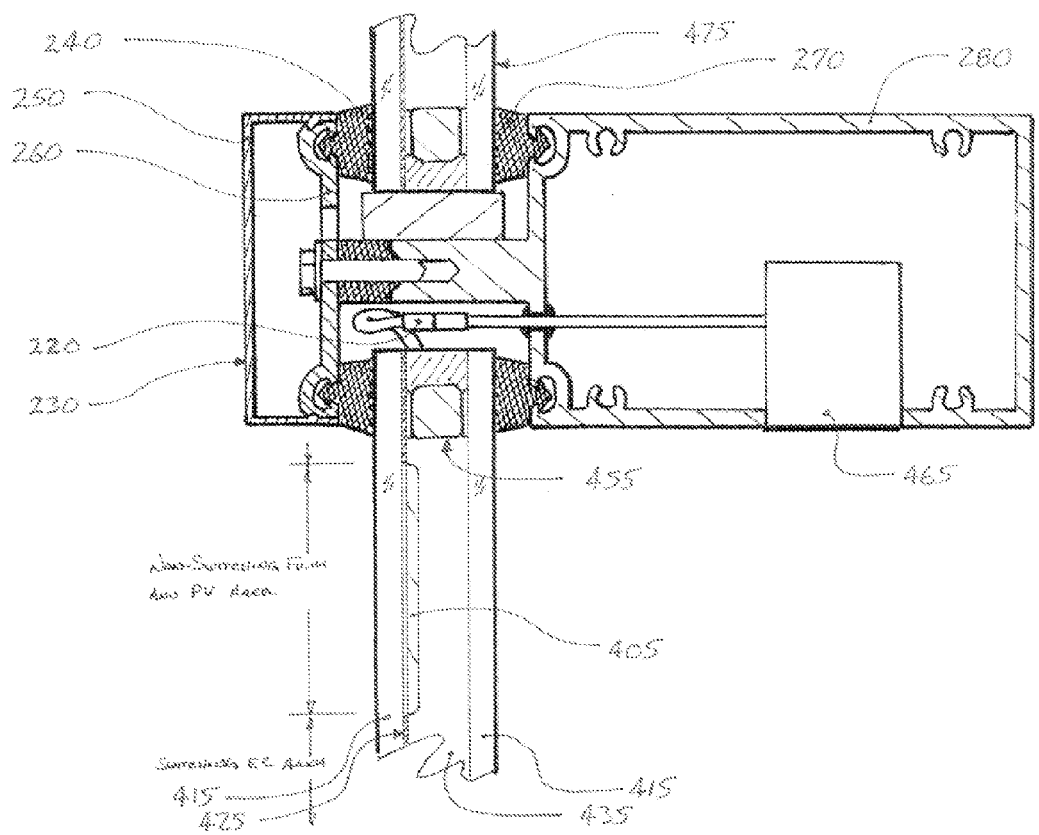
Figure 8C:
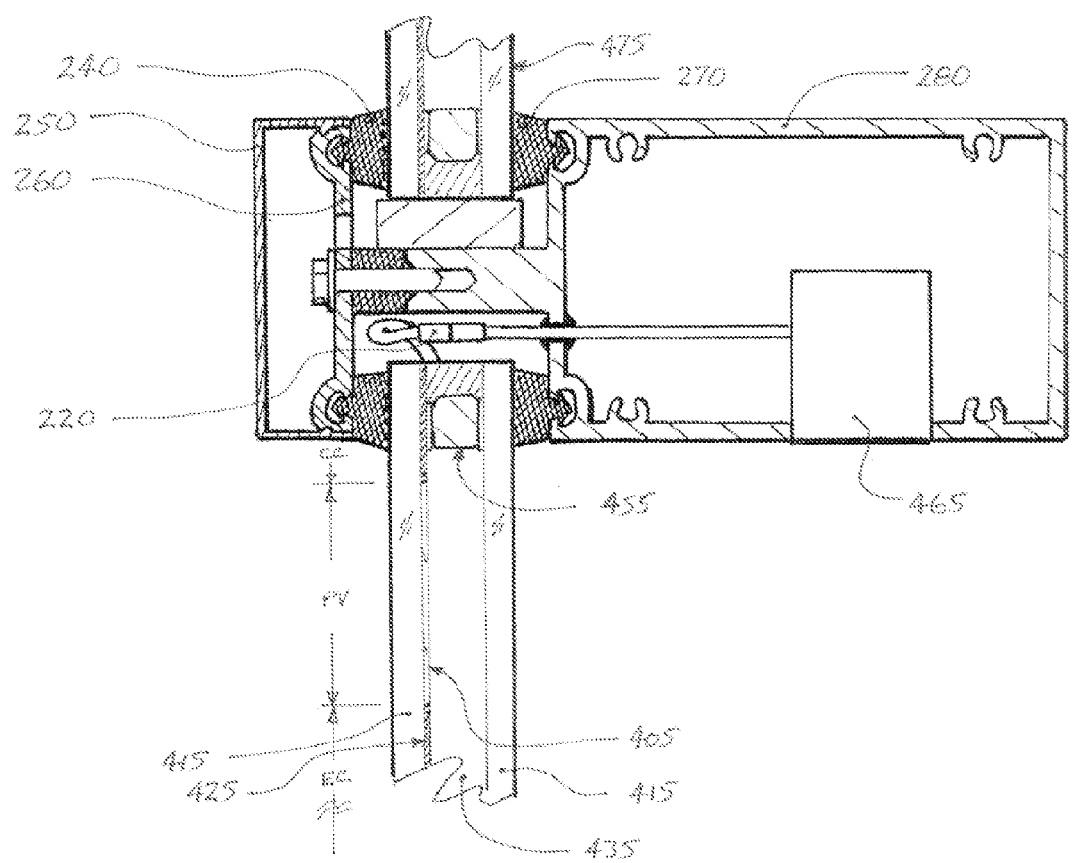
Figure 8D:
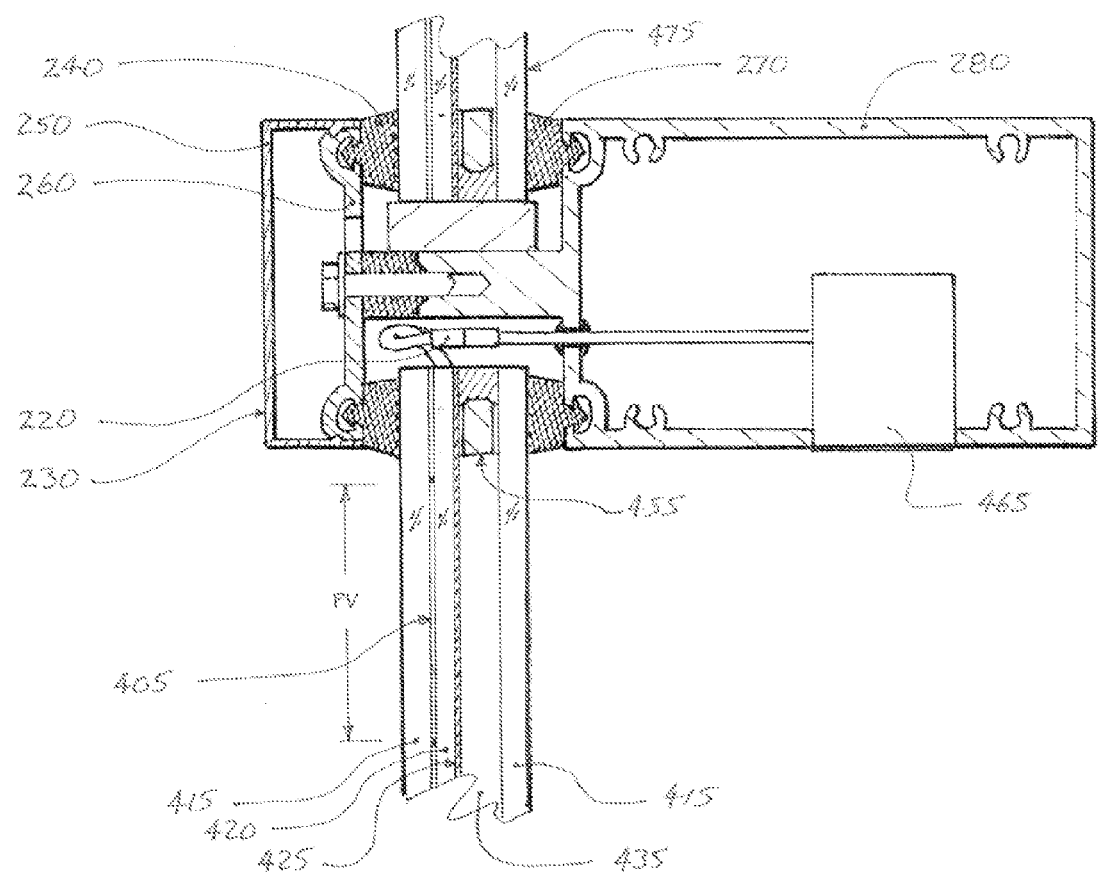
Figure 8E:
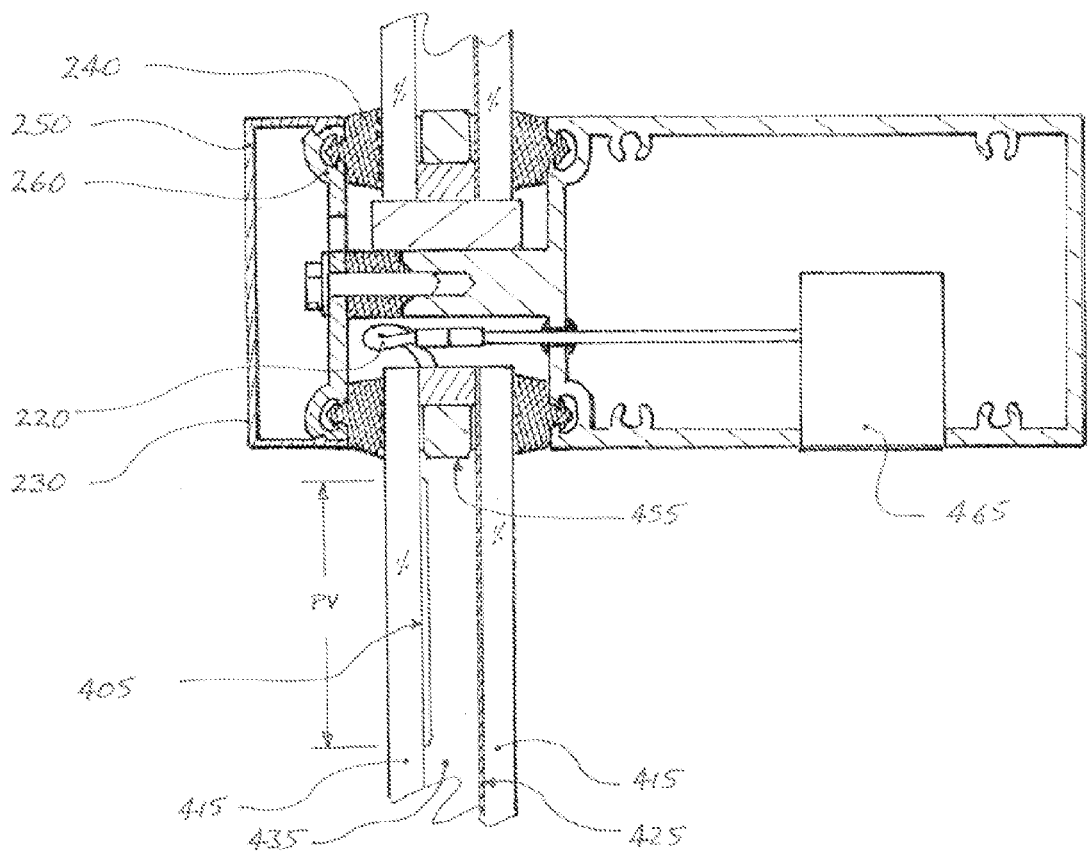
Figure 8F:
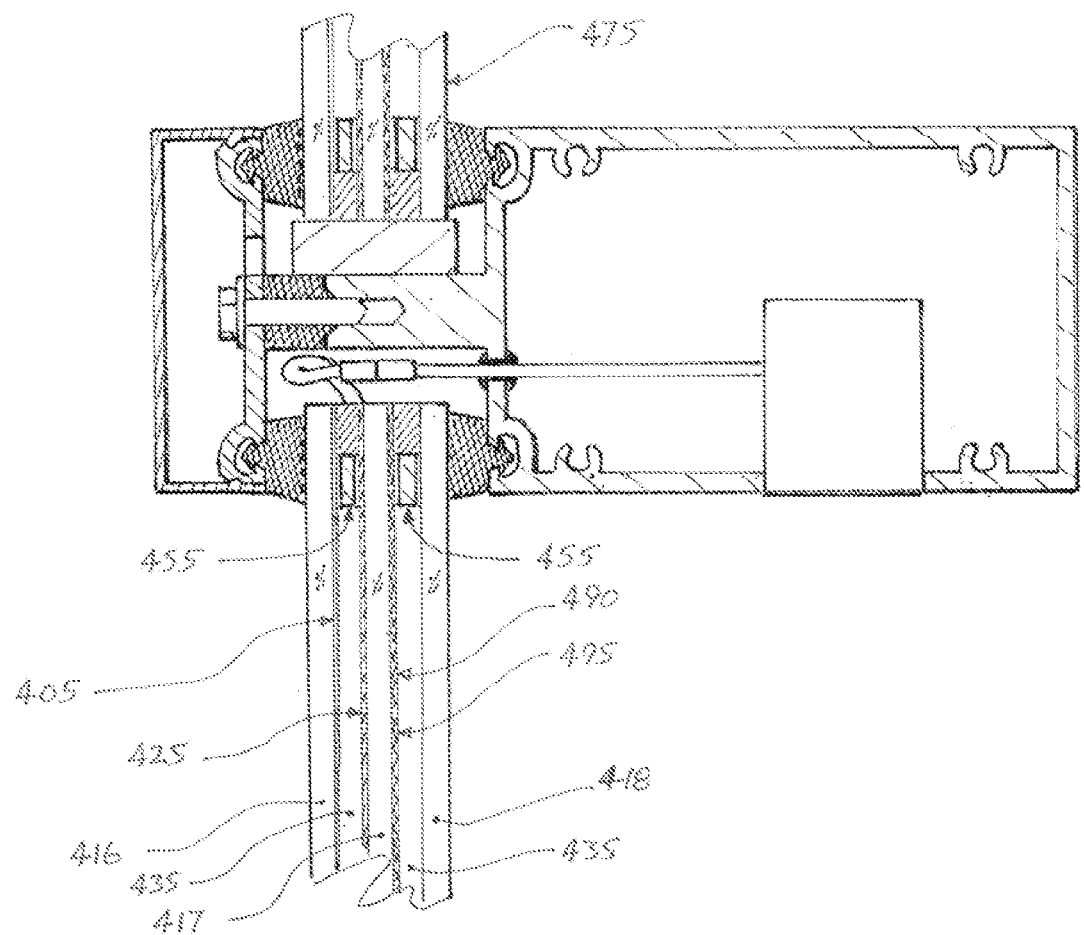

In yet other embodiments, the photovoltaic module may be mounted inside an IGU cavity, preferably on an exterior side of the electrochromic film layers (e.g., FIG. 8E).

Figure 9A:
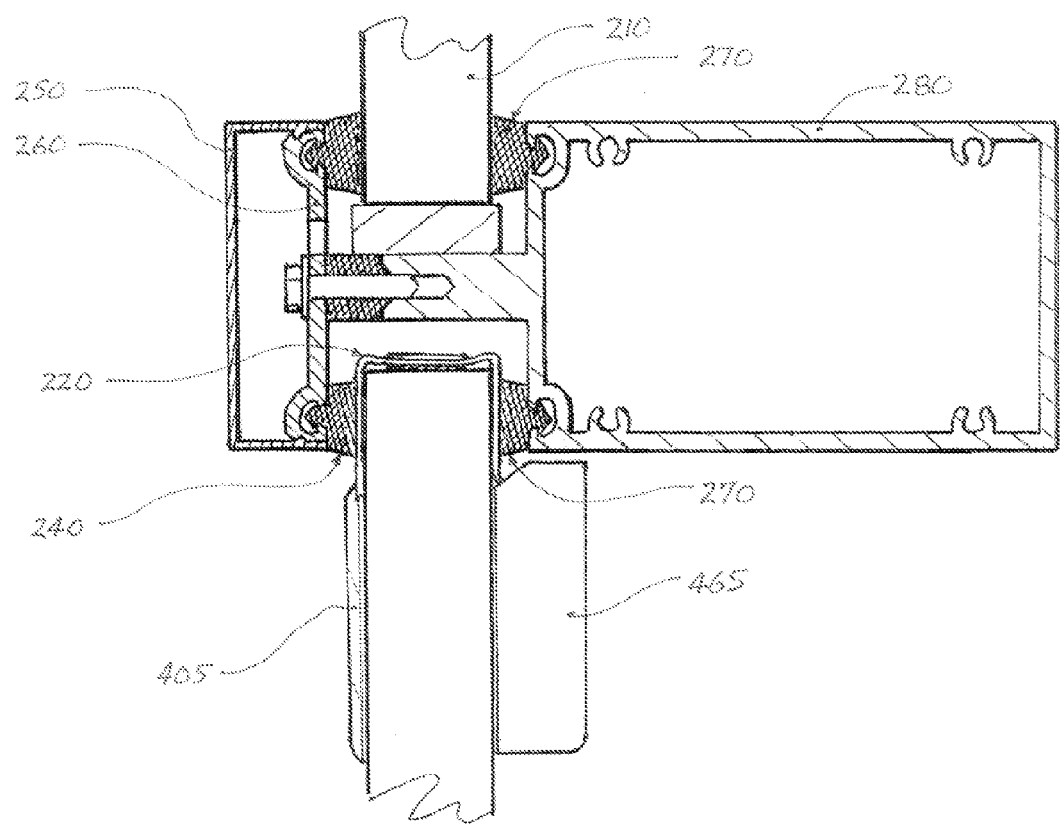
FIGS. 9a-9b provide configurations of a control system having a photovoltaic module, and electronics module, and an electrochromic glazing.
Figure 9B:
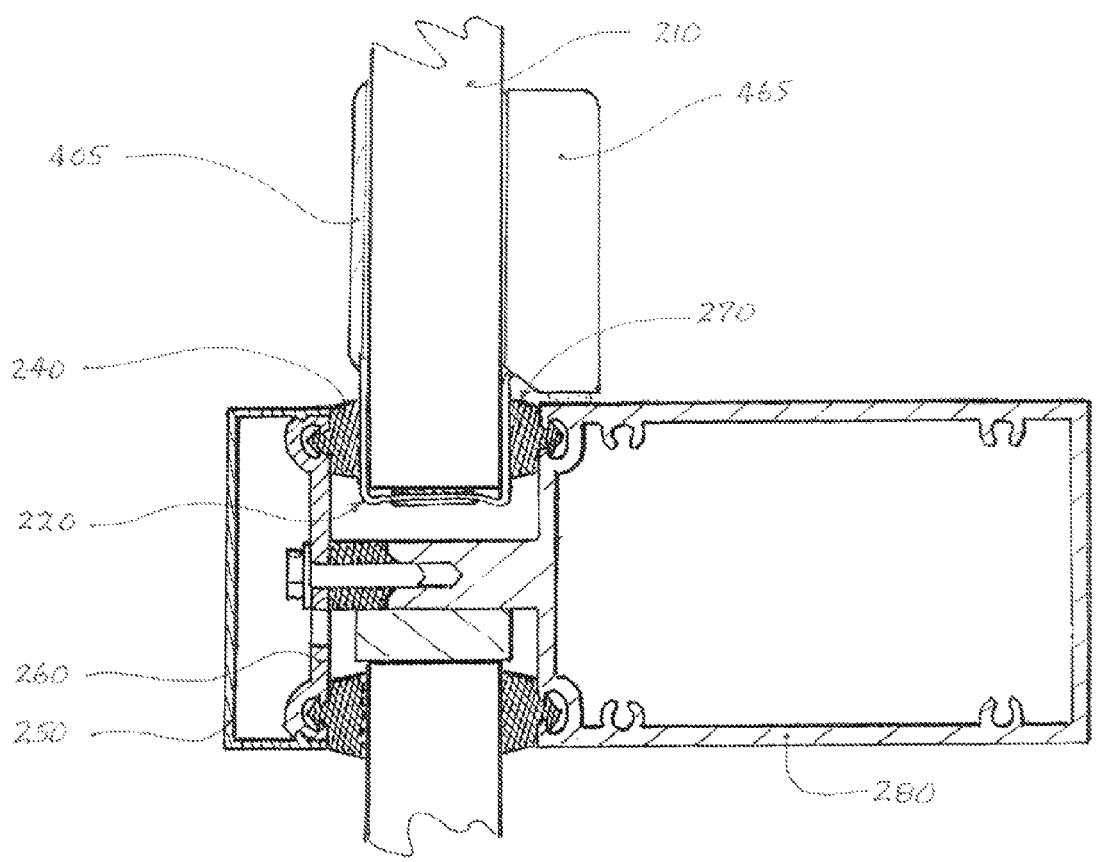

In a fifth aspect of the present invention (see FIG. 9), the configuration retains the photovoltaic module 405 inside the IGU but moves the electronics module 465 to the back side of the IGU. This, it is believed, has the advantage of being compatible with virtually any framing system.

In one embodiment, the feed-through between the glazing pocket and the interior of the building includes a flex circuit. However, any suitable penetration of the seal could be used, or any method of wireless energy transfer such as inductive or optical coupling. In other embodiments, the connection may be provided through a sealed hole in the glass directly to the inside of the building or, in yet other embodiments, through conductors adhered directly to the glass surface.

Methods for installing and maintaining electrochromic systems according to the present invention are outlined below.

In a first method, the IGU is installed in a glazing pocket while routing a pigtail wire from the IGU through an access hole in the building pressure plate. The exterior framing cover in then attached by standard means. A hole is then drilled in the cover large enough to reach in and make an electrical connection between the glazing and the control module. An electrical connection between wireless module and electrochromic glazing is made, and then mount module to surface of frame.

In a second method, the IGU is installed in a glazing pocket while routing a pigtail wire from the IGU through an access hole in the building pressure plate. A plug-in connection between the IGU pigtail wire and the wire passed through the cover from the control module, which has been pre-mounted to surface of frame, is then made. The exterior framing cover is then attached by standard means.

In a third method, the IGU is installed in a glazing pocket while routing a pigtail wire from the IGU through an access hole in the building pressure plate. At an off-site location, an electronics module and photovoltaic module are mounted to the framing system cover, with the photovoltaic on the outside and the electronics on the inside. On-site, the installer would then make a final connection between the cover-mounted electronics and the IGU pigtail. A cover plate is then attached in the usual manner.

In embodiments where photovoltaic power generation is an objective, it is possible to add wires connecting all the photovoltaic/electronic modules back to a central collection system to gather excess power. Then, the system would, it is believed, resemble a normal BIPV (building-integrated photovoltaic system) tightly integrated with an electrochromic glazing system. The excess power could, in some embodiments, be converted to grid power with an inverter, or connected directly to a low-voltage distribution system, such as that defined by the EMerge Alliance, for reduced installation cost and improved efficiency over a grid-tie system.

In some embodiments, the PV module and electronics are mounted on the glass rather than on the framing system, with no holes required to pass wires through. Installation of these embodiments is believed to be simpler, as the glass can be installed exactly like other types of glazing. In those cases, the photovoltaic panel and electronic module may either arrive at the installation site already attached, which may make the glazing more difficult to handle and install but minimizes installation labor, or they may be installed afterwards.

The present invention can be applied to other types of electrically active glazings, such as those including LED lighting or automated blinds.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electrochromic system, comprising:
    an insulated glass unit including a first glass pane and an electrochromic device having light transmissivity that is variable in response to an electrical current, wherein an external surface of the first glass pane lies along a first plane;
    a photovoltaic module electrically connected to the electrochromic device for providing the electrical current to the electrochromic device in response to light incident on the photovoltaic module, wherein:
        the photovoltaic module is mounted to the external surface of the first glass pane and is adjacent to an exterior building frame-work;
        the photovoltaic module has a light receiving surface that lies along a second plane that intersects the first plane and is oriented upward from a horizontal plane; and
    an electronics module in communication with either of the photovoltaic module or the electrochromic device.

2. The electrochromic system of claim 1, wherein the electronics module in wireless communication with a building automation system.

3. The electrochromic system of claim 1, wherein the first glass pane is an electrochromic glazing.

4. The electrochromic system of claim 1, wherein the insulated glass unit includes a laminate of the first glass pane and another glass pane.

5. The electrochromic system of claim 1, wherein the photovoltaic module covers a portion of the visual surface of the first glass pane.

6. The electrochromic system of claim 1, wherein the electronics module is mounted adjacent to the electrochromic device on an interior or exterior building frame-work.

7. The electrochromic system of claim 1, wherein the photovoltaic module and the electronics module are mounted at different locations.

8. The electrochromic system of claim 7, wherein the electronics module is located inside or protruding into a framing system, and wherein the electronics module is in wireless communication with a building automation system.

9. The electrochromic system of claim 7, wherein the electronics module is located in an interior frame-work, and wherein the electronics module is in wireless communication with a building automation system.

10. The electrochromic system of claim 1, wherein the photovoltaic module and the electronics module are combined into a single unit.

11. The electrochromic system of claim 10, wherein the combined photovoltaic and electronics module have a thickness less than about 10 mm.

12. The electrochromic system of claim 1, wherein the electronics module responds to solar intensity such that the electrochromic device tints or colors proportionally to available sunlight.

13. The electrochromic system of claim 1, wherein the electronics module comprises control logic means.

14. The electrochromic system of claim 13, wherein the control logic means monitors available energy from the photovoltaic module.

15. The electrochromic system of claim 1, further comprising a battery.

16. The electrochromic system of claim 1, wherein the photovoltaic module and the electronics module are combined and mounted to the external surface of the first glass pane.

17. The electrochromic system of claim 16, wherein the electronics module is in wireless communication with a building automation system.

18. The electrochromic system of claim 1, wherein the electronics module comprises a photovoltaic module and a resistor wired in parallel with an electrochromic device wiring.

19. The electrochromic system of claim 1, wherein the photovoltaic module is connected to the electronics module through an electrical feed-through.

20. The electrochromic system of claim 1, wherein the photovoltaic module is coupled to the electronics module via a wireless energy transfer means.

21. An electrochromic system, comprising:
    an electrochromic device having light transmissivity that is variable in response to an electrical current;
    a glass pane having a viewing surface that lies along a first plane;
    a photovoltaic module electrically connected to the electrochromic device for providing the electrical current to the electrochromic device response to light incident on the photovoltaic module, wherein:
        the photovoltaic module is mounted adjacent to the electrochromic device and overlies a surface of an exterior building frame-work, wherein the surface of the exterior building frame lies along a second plane that intersects the first plane;
        the photovoltaic module has a first surface, a second surface, and a light receiving surface,
            the first surface is parallel to the first plane and has a proximal end closer to the second surface and a distal end farther from the second surface;
            the second surface is parallel to the second plane and has a proximal end closer to the first surface and a distal end farther from the first surface;
            the light receiving surface extends between the distal ends of the first and second surfaces of the photovoltaic module;
            the light surface is farther from the proximal ends of the first and second surface surfaces than the distal ends of the first and second surfaces; and
            the light receiving surface lies along a single plane that intersects the first and second planes; and
    an electronics module in communication with either of the photovoltaic module or the electrochromic device, wherein the electronics module is in wireless communication with a building automation system.

22. The electrochromic system of claim 21, wherein the first and second planes are perpendicular to each other.

23. The electrochromic system of claim 21, wherein the photovoltaic module is mounted to the surface of the exterior building frame-work.